US012525884B2

(12) United States Patent
Kalluri et al.

(10) Patent No.: US 12,525,884 B2
(45) Date of Patent: Jan. 13, 2026

(54) INPUT ISOLATED VOLTAGE MONITOR WITH VOLTAGE TRACKING (71) Applicant: Hamilton Sundstrand Corporation, Charlotte, NC (US)

(72) Inventors: Nageswara Rao Kalluri, Karnataka (IN); Tanay Ghose, West Bengal (IN); Manish Kumar, Karnataka (IN); Bapu Kallappa Banahatti, Karnataka (IN); Premanshi Jain, Rajasthan (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 119 days.

(21) Appl. No.: 18/461,979

(22) Filed: Sep. 6, 2023

(65) Prior Publication Data
US 2024/0266962 A1    Aug. 8, 2024

(30) Foreign Application Priority Data

Feb. 6, 2023    (IN) .............................. 202311007407
Mar. 28, 2023   (IN) .............................. 202311022605

(51) Int. Cl.
*H02M 3/335*    (2006.01)
*H02M 1/32*     (2007.01)

(52) U.S. Cl.
CPC ......... *H02M 3/33507* (2013.01); *H02M 1/32* (2013.01)

(58) Field of Classification Search
CPC .. H02M 3/33507; H02M 1/32; H02M 1/0025; H02M 3/33515; H02M 3/33523
See application file for complete search history.

(56) References Cited

U.S. PATENT DOCUMENTS

| 7,719,248 B1* | 5/2010 | Melanson | H02M 1/4225 |
| | | | 323/283 |
| 8,120,931 B2* | 2/2012 | Chang | H02M 1/32 |
| | | | 363/21.07 |

(Continued)

FOREIGN PATENT DOCUMENTS

CN    101127487 A    2/2008
CN    101253372 A    8/2008

(Continued)

OTHER PUBLICATIONS

European Search Report for Application No. 24155374.2, mailed Jul. 8, 2024, 7 pages.

(Continued)

*Primary Examiner* — Adolf D Berhane
*Assistant Examiner* — Afework S Demisse
(74) *Attorney, Agent, or Firm* — CANTOR COLBURN LLP (57) ABSTRACT A fly-back circuit includes a voltage source, a transformer comprising a primary winding electrically coupled to the voltage source and a secondary winding electrically coupled to a load, a diode connected between the secondary winding and the load, a switch electrically coupled to the primary winding, a controller operable to open and close the switch to control energy transfer from the primary winding to the secondary winding; and a voltage monitor connected to a node between the secondary winding and the diode. The voltage monitor includes a processor that generates a variable threshold tracking voltage (Vthtracking), generates an output signal that is a toggling output when voltage at the node is above Vthtracking and a constant output when the voltage source is operating below Vthtracking and increases Vthtracking when the output signal is toggling until the output signal is not toggling.

16 Claims, 8 Drawing Sheets (56) References Cited

U.S. PATENT DOCUMENTS

| | | | |
|---|---|---|---|
| 8,587,968 | B2 | 11/2013 | Zhu et al. |
| 9,318,962 | B2 | 4/2016 | Gao et al. |
| 2019/0341852 | A1* | 11/2019 | Fahlenkamp ..... H02M 3/33515 |
| 2021/0376742 | A1 | 12/2021 | Liu et al. |
| 2022/0311329 | A1 | 9/2022 | Santoro et al. |
| 2024/0264208 | A1 | 8/2024 | Kalluri et al. |

FOREIGN PATENT DOCUMENTS

| | | |
|---|---|---|
| CN | 105338681 A | 2/2016 |
| CN | 113243076 B | 11/2022 |
| JP | 2000125556 A | 4/2000 |
| JP | 2019068695 A | 4/2019 |
| TW | 201322576 A | 6/2013 |

OTHER PUBLICATIONS

Abstract for CN113243076 (B), Published: Nov. 1, 2022, 1 page.
1 European Search Report for Application No. 24155714.9, mailed Jul. 5, 2024, 7 pages.

* cited by examiner

INPUT ISOLATED VOLTAGE MONITOR WITH VOLTAGE TRACKING

CROSS-REFERENCE TO RELATED APPLICATIONS

This application claims the benefit of Indian Patent Application No. 202311007407 filed Feb. 6, 2023, and Indian Patent Application No. 202311022605 filed Mar. 28, 2023, the disclosures of which are incorporated herein by reference in their entirety.

BACKGROUND

Embodiments of the present disclosure relate to electrical power systems, and more particularly, to a voltage monitor connected to a secondary side of the DC-to-DC converter that monitors voltage on a primary side of the DC to DC converter.

One of the most common switching power supply converters is a Fly-back Converter. The fly-back topology is based on a buck-boost topology, with the transformer providing isolation and, if needed, voltage transformation by turns ratio.

The primary parameter that must be monitored for proper functioning of the Fly-back Converter is the voltage level on the primary side. If the input voltage drops below a predefined threshold and the same can be monitored and flagged, then this information can be used as a preemptory measure to indicate an impending power interrupt before the downstream power supplies stop operating. This "ahead-of-time" warning allows the system to signal the power interrupt condition to any other higher-level system in the architecture, log the failure data to any on-board memory and enter a fail-safe state before all power is lost.

The traditional means of determining this undervoltage condition is monitoring the voltage on the primary side and then passing the monitored level through an isolation barrier, to a control a device on the secondary side of the converter.

BRIEF DESCRIPTION

Disclosed is a fly-back circuit and method. The flyback circuit/method can track the primary side voltage in conditions between above an undervoltage threshold.

In one aspect, a fly-back circuit is disclosed. The circuit includes a voltage source, a transformer comprising a primary winding electrically coupled to the voltage source and a secondary winding electrically coupled to a load, a diode connected between the secondary winding and the load, a switch electrically coupled to the primary winding and a controller operable to open and close the switch to control energy transfer from the primary winding to the secondary winding. The circuit also includes a voltage monitor connected to a node between the secondary winding and the diode. The voltage monitor includes a processor that generates a variable threshold tracking voltage (Vthtracking) and generates an output signal that is a toggling output when voltage at the node is above Vthtracking and a constant output when the voltage source is operating below Vthtracking. Vthtracking is increased when the output signal is toggling until the output signal is not toggling.

In any prior circuit, the processor can be a digital signal processor that determines whether the output signal is toggling or not toggling and increases Vthtracking when the output signal is toggling and decreases the output signal is not toggling.

In any prior circuit, the voltage monitor can include a comparator that produces the output signal.

In any prior circuit, wherein the comparator can include a first input connected to the node and second input connected to Vthtracking.

In any prior circuit, the circuit can also include a filter connected between an output of the digital signal processor and non-inverting input that smooths a pulse width modulated signal produced by the digital signal processor to convert the pulse width modulated signal into Vthtracking. The filter can be an RC circuit or another type of circuit.

In any prior circuit, the first input is an inverting input and the second input is a non-inverting input.

In any prior circuit, the circuit can also include a voltage divider between the node and the first input.

In any prior circuit, controller can be a pulse width modulation controller operable to output a sequence of pulses to open and close the switch based on determining that the voltage source exceeds a minimum control voltage.

Also disclosed is a method. The method can be implemented in any circuit as described herein or specified above. The method can include: providing with a voltage source an input voltage to a primary side of a fly-back circuit that includes primary winding and a secondary winding; controlling a switch electrically coupled to the primary winding to transition between an open state and a closed state to control energy transfer from the primary winding to the secondary winding; monitoring voltage with a voltage monitor connected to the secondary winding at a node, wherein the voltage monitor includes a processor that generates a variable threshold tracking voltage (Vthtracking); generating and output signal with the voltage monitor that is a toggling output when voltage at the node is above Vthtracking and a constant output when the voltage source is operating below Vthtracking; and increasing Vthtracking when output signal is toggling and decreasing Vthtracking when the output signal is not toggling.

In any prior method, the voltage monitor cam include a comparator that produces the output signal.

In any prior method, the comparator can include a first input connected to the node and second input connected to a monitor threshold voltage. The first input can be an inverting input and the second input can be a non-inverting input.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

In applications using a fly-back power supply for generating local on-board power supplies, there can be many components that add to system complexity. For example, the traditional means of determining this undervoltage condition from the input voltage (Vin from voltage source 26 below) require circuity that monitors the input voltage and then passes the monitored level through an isolation barrier, to a control device (e.g., voltage controller) on the secondary side of the converter. One disadvantage of this method is the use of an additional isolation barrier to allow the interfacing of the circuit output to the control device. This additional isolation requirement directly adds material cost, area, and complexity (to maintain the isolation) to the design.

Figure 1:
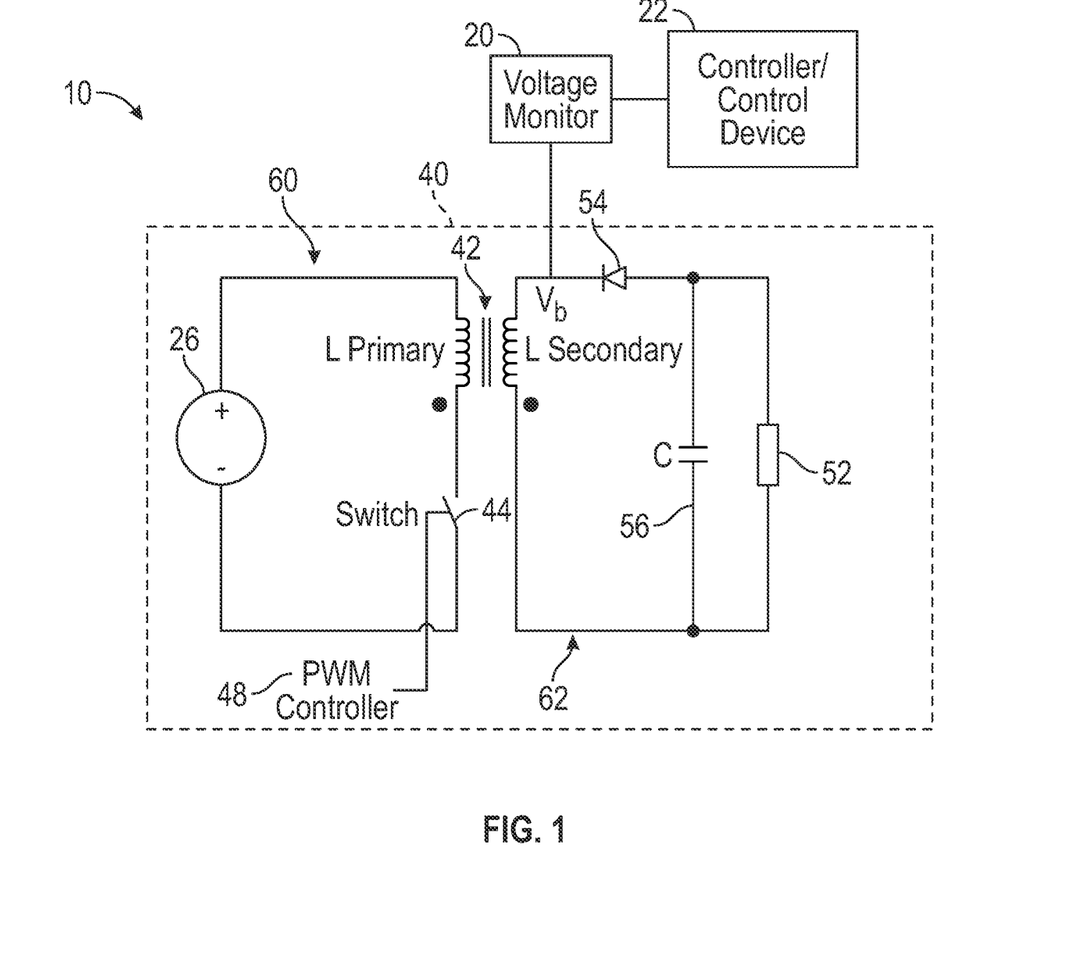
FIG. 1 is a schematic view of a fly-back converter in accordance with an embodiment of the disclosure.

Turning to the figures, FIG. 1 depicts a power supply circuit 10 including a voltage monitor 20 and a fly-back circuit 40.

The fly-back circuit 40 includes a switch 44 electrically coupled to the voltage source 26 and a primary winding 46 of the transformer 42. The transformer 42 also includes a secondary winding 50 electrically coupled to a load 52. A diode 54 shall be in series with the load 52, and a capacitor 56 can be in parallel with the load 52. In some instances, the primary winding 46 and secondary winding 50 can be inductors that are air coupled to form the transformer 42. In short, the fly-back circuit 40 operates as a DC-to-DC converter and galvanically isolates the load 52 from the voltage source 52.

In embodiments, the controller 48 is operable to open and close the switch 44 to control energy transfer from the primary winding 46 to the secondary winding 50 Control logic of the controller 48 can be implemented by analog circuitry, executable instructions and/or digital circuitry, such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Operation in this manner can create isolation between the voltage source 26 and devices (e.g., device controller 22) on the secondary side. For example, the controller 22 could be a device that controls operation of the load 52.

As noted above, in some cases the voltage at the voltage source 26 can fall below a desired level and this will, consequently, result in a voltage drop on the secondary side (e.g., Vb). The controller 22 may need to know that the voltage has fallen. However, as noted above, if there is monitor on the primary side providing that information to the controller 22, further isolation circuits can be required. Thus, disclosed herein is voltage monitor that can determine that the voltage at the voltage source 26 has fallen a desired threshold and that is not connected to the primary side of the fly-back converter. This is possible because Vb is a function of the primary voltage and the turns ratio of the transformer 42. Herein, the primary side of the fly-back converter is denoted by reference numeral 60 and the secondary side of the fly-back converter is denoted by reference numeral 62.

Figure 2:
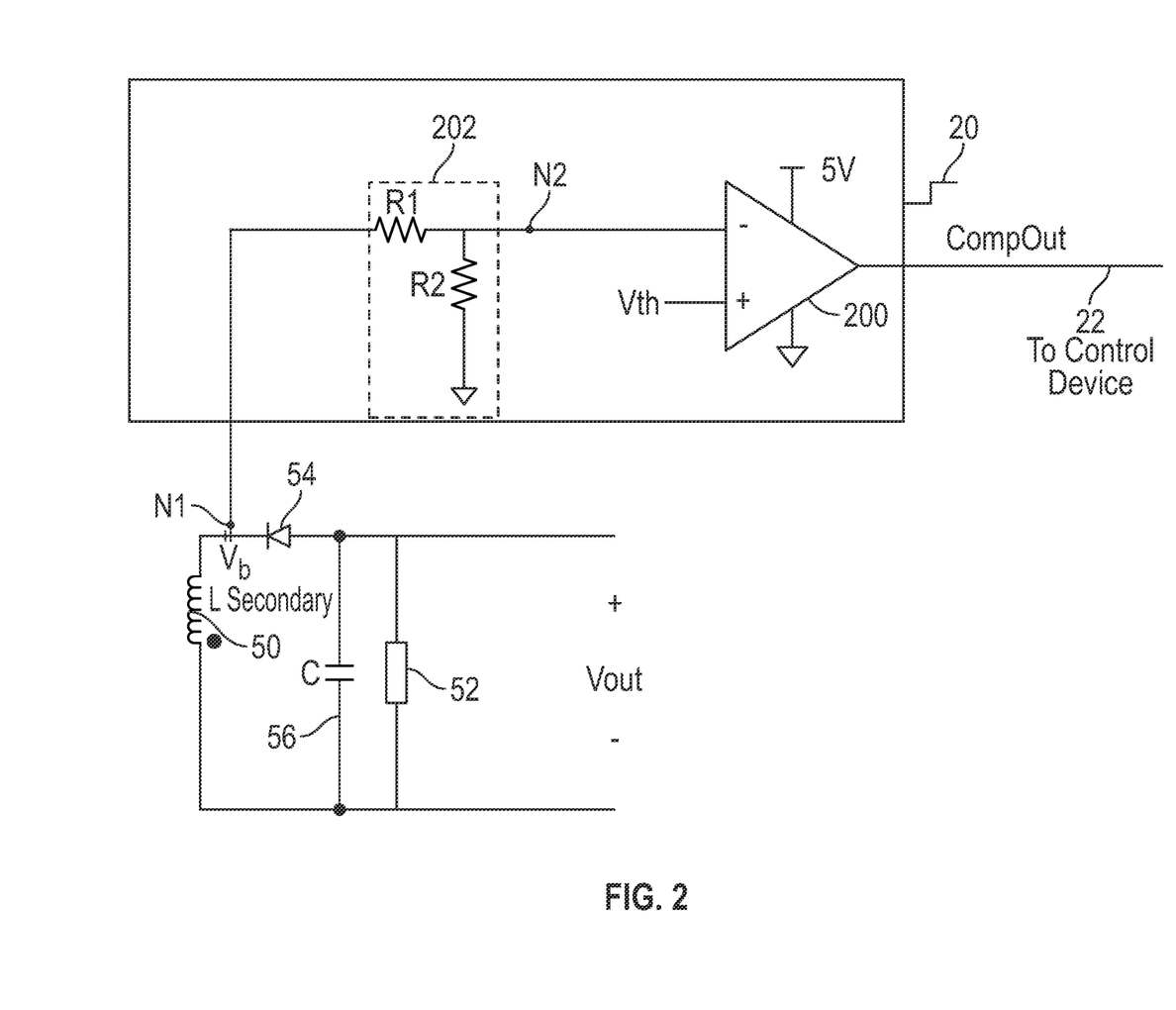
FIG. 2 is a more detailed depiction of a portion of the fly-back converter in accordance with an embodiment of the disclosure.

FIG. 2 a more detailed version of the voltage monitor 20 connected to the secondary side 62 of the fly-back converter. FIG. 2 will be discussed in relation to FIGS. 3A-3D.

The voltage monitor 20 is connected to a monitors the voltage at node (N1) that is electrically between the secondary winding 50 and the diode 54. The voltage at N1 is the voltage across the secondary winding 50 and is labelled at Vb in FIG. 2.

The voltage monitor 20 illustrated in FIG. 2 includes a comparator 200. This comparator 200 will compare the voltage at N1 (or a scaled version thereof) to a monitor threshold voltage Vth. In the event the voltage is to be scaled, an optional voltage divider 202 can be connected between N1 and the comparator 200. The reduced voltage is presented at node N2 and can be referred to as a reduced or divided voltage herein. The scaled or unscaled voltage is provided to a first input of the comparator 200. A threshold voltage Vth is connected to as second input of the comparator 200. As shown, the first input is the inverting input of the comparator 200 and the second input is the non-inverting input of the comparator 200. However, the skilled artisan can modify these connections (and thus Vth) without departing from the teachings herein.

The voltage divider is shown an including R1 serially connected between node N1 and node N2 and R2 being connected between node N2 and ground. The skilled artisan will realize that other voltage dividing configurations could be implemented. The comparator will produce an output (CompOut) as described below.

Figure 3A:
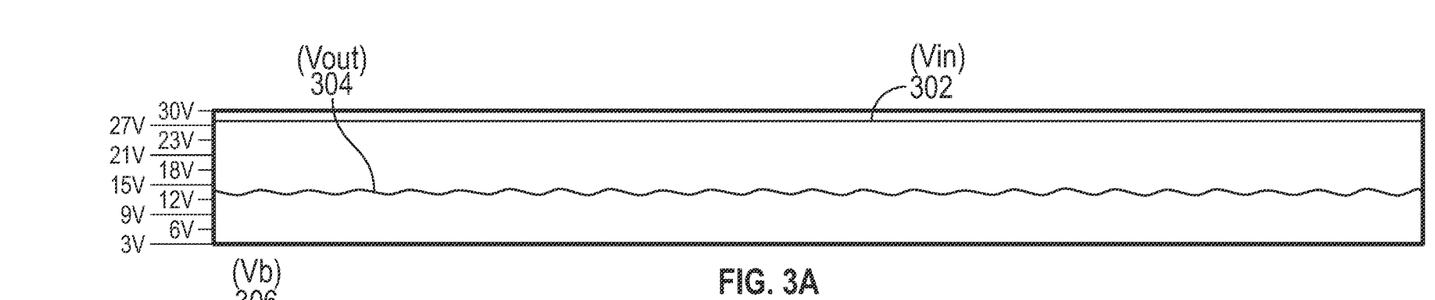
FIGS. 3A-3D show voltages at different locations in the fly-back converter of FIGS. 1 and 2.

With reference to FIGS. 2 and 3A-3D assume that the voltage source 26 is providing a constant voltage of approximately 27 V as shown in FIG. 3A by trace 302 and can be referred to a Vin herien. In normal operation, this will result (based on turns ratio) an output voltage (Vout) across the load 52 of about 14 V FIG. 3B as will be understood by the skilled artisan. This output voltage (Vout) is shown by trace 304 in FIG. 3A.

Figure 3B:
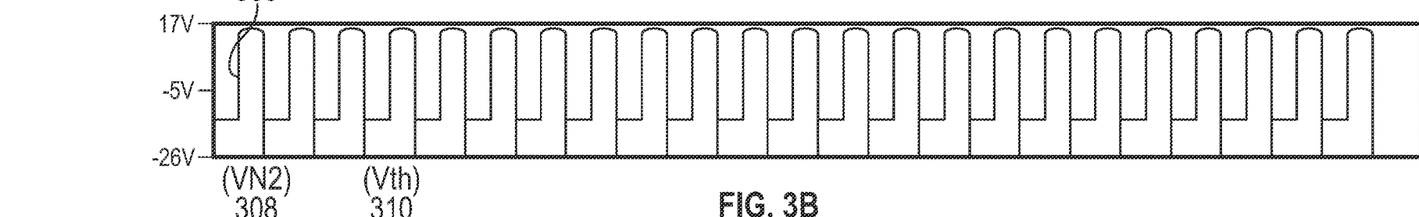
Figure 3C:
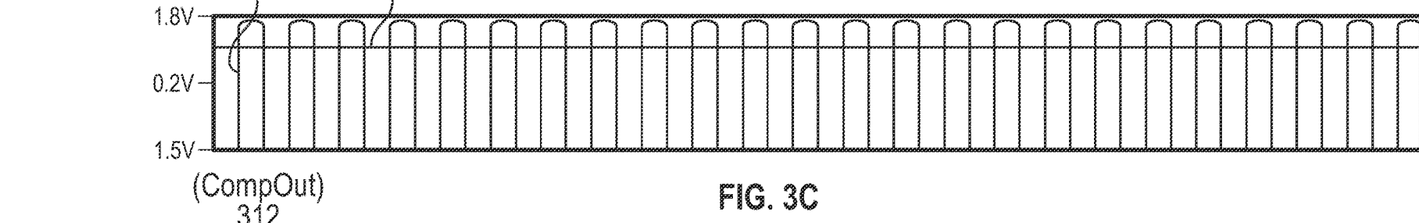
Figure 3D:
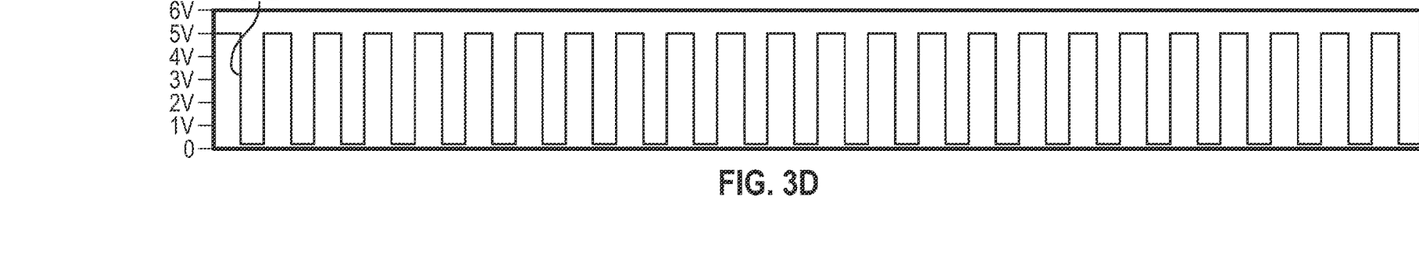

FIG. 3B gives generally shows the voltage at N1 (Vb) shown by trace 306. FIG. 3C shows the voltage at N2 (VN2) in the case where the voltage divider had been included. This reduced voltage is illustrated by trace 308. FIG. 3C also shows threshold voltage Vth shown by trace 310. As noted above, the comparator 200 will compare VN2 to the threshold. If VN2 periodically rises above Vth, the comparator 200 will produce a pulsed output at CompOut and as illustrated by trace 312. The controller 22 can then determine that the voltage being provided by the voltage source 26 of FIG. 1 is producing a sufficient voltage.

Figure 4A:
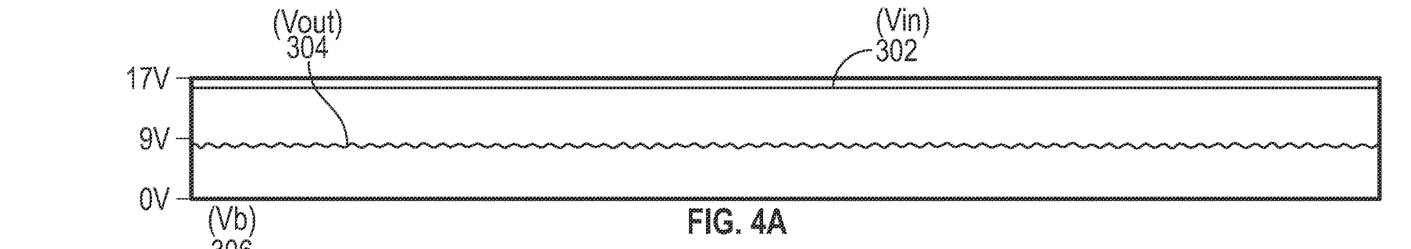
FIGS. 4A-4D show voltages at different locations in the fly-back converter of FIGS. 1 and 2 during an under-voltage situation.

With further reference to FIGS. 4A-4D, now consider the case where the input voltage on the primary side 60 drops. In this example, instead of 27V as in FIG. 3A, assume Vin has fallen to 16V. In this case, assume that it is desired to keep Vin above 17V. This desired input value can be referred to as an input voltage threshold. This voltage drop at Vin will result in the in proportional voltage on the secondary side 62. This is illustrated in FIG. 4A with Vout falling to, for example, 9V as shown in FIG. 4A. This will result in the comparator output remaining high, with no toggling (see e.g., FIG. 4D).

Figure 4B:
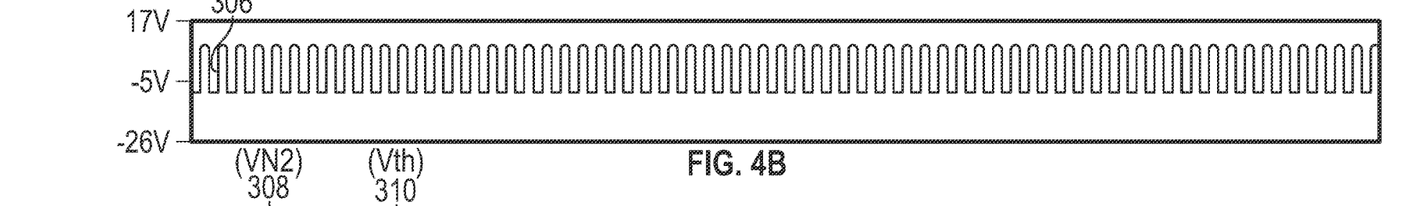
Figure 4C:
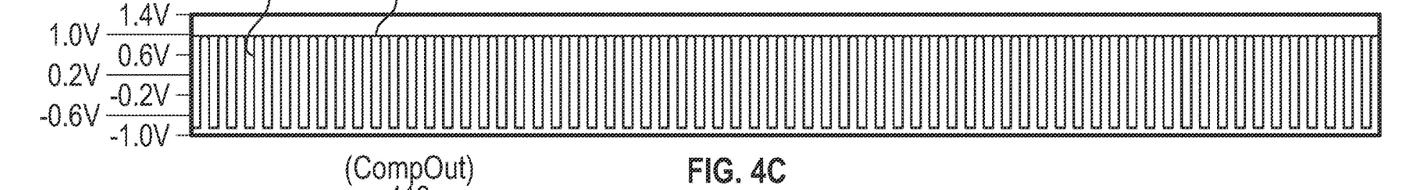
Figure 4D:
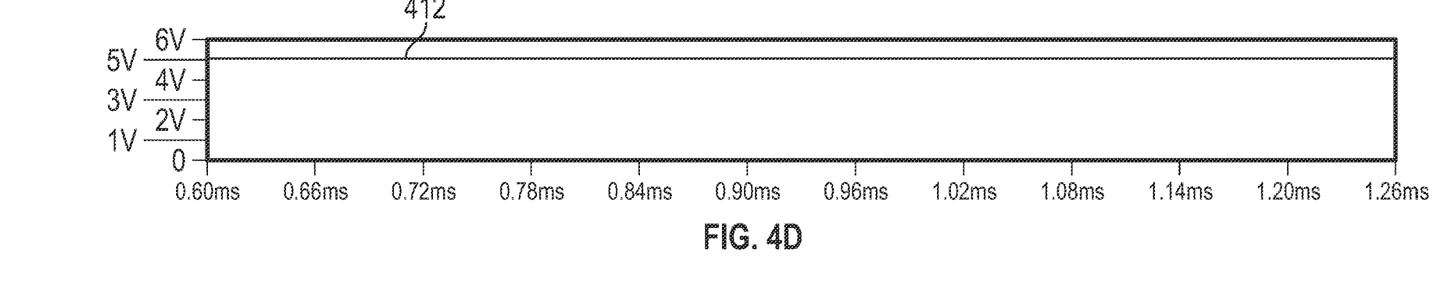

FIG. 4B gives generally shows the voltage at N1 (Vb) shown by trace 306 in the reduced voltage situation. FIG. 4C shows the voltage at N2 (VN2) in the case where the voltage divider had been included. This reduced voltage is illustrated by trace 308. FIG. 4C also shows threshold voltage Vth shown by trace 310. As noted above, the comparator 200 will compare VN2 to the threshold. In this example, VN2 does not periodically rises above Vth. As such, the comparator 200 will produce constant output CompOut and as illustrated by trace 412. The controller 22 can then determine that the voltage being provided by the voltage source 26 of FIG. 1 is producing has fallen and take remedial action.

In the above example, the input voltage threshold for the input to the fly-back circuit 40 was set to 16V. That is, the comparator output (CompOut) shall toggle when the input is greater than 16V at the primary side and cease to toggle when it drops below 16V. This can be done (as opposed to in the prior art) by monitoring Vb in instead of the input voltage provided by the voltage source 26 (or any other value on the primary side 60). Stated differently, the voltage monitor 20 can be electrically coupled to but galvanically isolated from the voltage source 26. While the above examples have been given for a 15V output voltage, the voltage divider 202 could be adjusted for other expected values of Vout.

Figure 5:
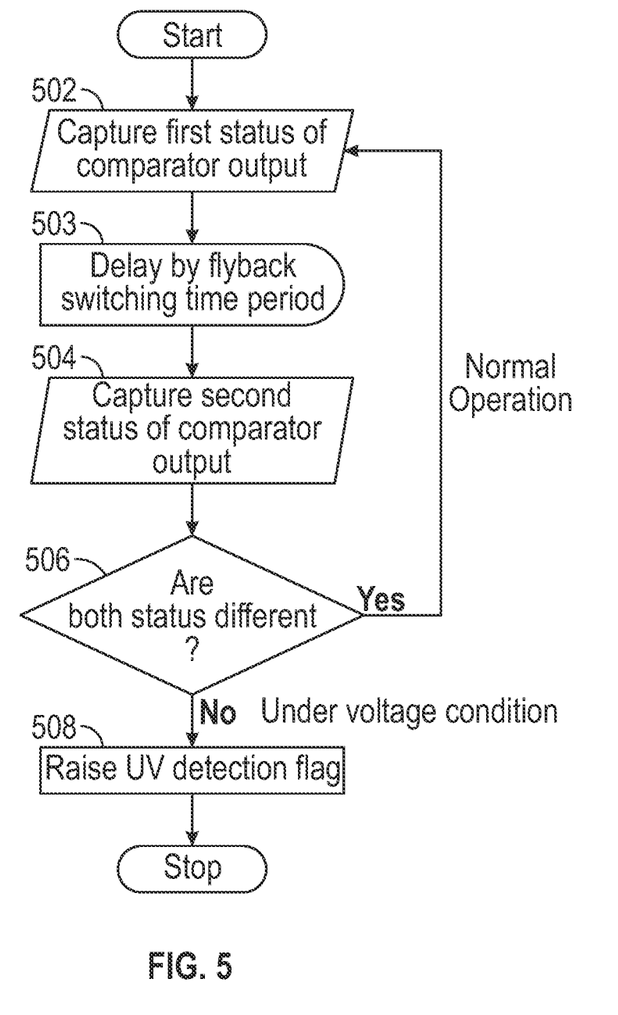
FIG. 5 shows a method of operating the fly-back converter of FIGS. 1 and 2.

FIG. 5 shows a flow chart of a method according to one embodiment. This is one method of monitoring the output (CompOut) of the comparator 200. In short, if CompOut is toggling (see FIG. 3D) it can be assumed that the voltage provided by the voltage source 26 has not fallen too low for desired operation. However, if CompOut is not toggling then the control device 22 may raise an input undervoltage flag. This flag can be utilized by, for example, a higher-level system which can command the unit to enter a fail-safe mode.

At block 502 a first sample of the output of the comparator 200 can be taken. Then, at block 504 a second sample can be taken. This sample can be taken at a time that is delayed by known delay period. That period can be, for example, the fly-back switching period as indicated by block 503. The two samples are compared at block 506. If they are the same, the controller can determine a low voltage situation has arisen and raise an alarm or other flag (block 508). If they are different (e.g., CompOut is toggling), it can be determined that the voltage source is providing the determined minimum voltage and processing can return to block 502.

In the above example, the threshold voltage Vth was a set value. This can be referred to as discrete measurement mode system.

In one embodiment, this value can change to track the voltage at N2. As N2 is scaled version of voltage at N1 ($V_b$), tracking N2 gives a general tracking of the voltage at the voltage supply 26. In the following description, a digital signal processor is provided to enable such tracking. That DSP can be used in any system disclosed above. Further, the DSP could set both a constant Vth and a pulse width modulated (PWM) control signal Vthcontrol that is used to track the voltage at N2. In such a case, both comparators 200 could be connected to N2 or each could have their own scaling resistors that are both connected to N1.

Figure 6:
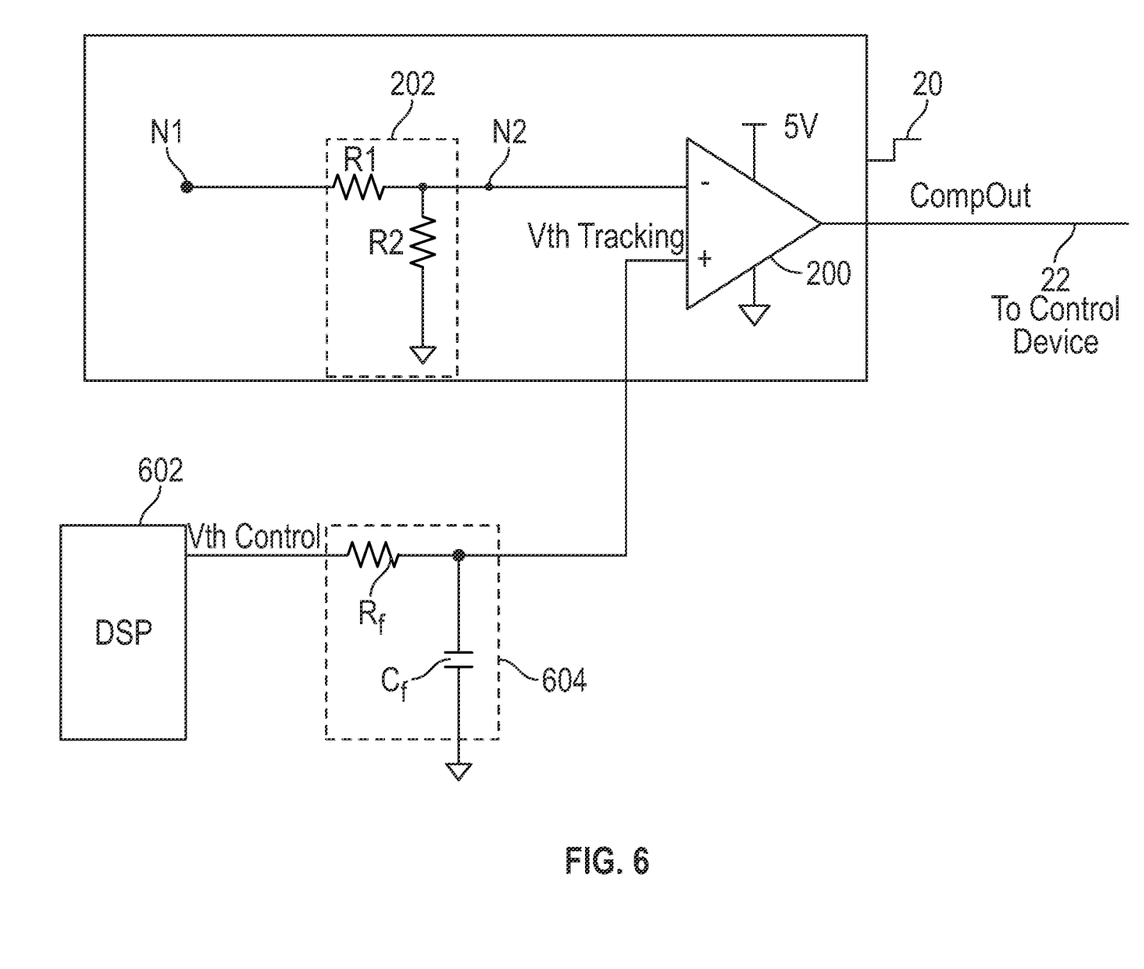
FIG. 6 shows a voltage monitor for a fly-back converter in accordance with an embodiment of the disclosure that can track the input voltage.

In more detail, and with reference to FIG. 6, the system 10 of FIG. 1 can include a DSP 602. The DSP 602 can be part of control device 22 in one embodiment. In another, it can be a stand alone element or be part of the voltage monitor 20. As will be understood from the below, the DSP 602 will allow for operation in a continuous tracking mode.

The system shown in FIG. 6 includes a filter 604 that smooths the PWM signal Vthcontrol into a stable but variable value Vthtracking. As shown, the filter 064 is an RC filter but other types of filters could be used. The filter 604 as shown includes $R_f/C_f$ where $C_f$ is connected between $R_f$ and ground as shown and Vthtracking is provided at the node tween $R_f$ and $C_f$.

The system in FIG. 6, similar to the above, includes a voltage monitor 20 connected to and monitors the voltage at node (N1) that is electrically between the secondary winding 50 and the diode 54. The voltage at N1 is the voltage across the secondary winding 50 of FIG. 2

The voltage monitor 20 illustrated in FIG. 6 includes a comparator 200. This comparator 200 will compare the voltage at N1 (or a scaled version thereof) to the tracking voltage Vthtracking.

In the event the voltage is to be scaled, an optional voltage divider 202 can be connected between N1 and the comparator 200. The reduced voltage is presented at node N2 and can be referred to as a reduced or divided voltage herein. The scaled or unscaled voltage is provided to a first input of the comparator 200. The tracking voltage Vthtracking is connected to as second input of the comparator 200. As shown, the first input is the inverting input of the comparator 200 and the second input is the non-inverting input of the comparator 200. However, the skilled artisan can modify these connections (and thus Vthtracking) without departing from the teachings herein.

The voltage divider is shown an including R1 serially connected between node N1 and node N2 and R2 being connected between node N2 and ground. The skilled artisan will realize that other voltage dividing configurations could be implemented. The comparator will produce an output (CompOut) as described below. In general, when the tracking voltage Vthtracking is less than the voltage an N2, the output signal CompOut will toggle.

Figure 7:
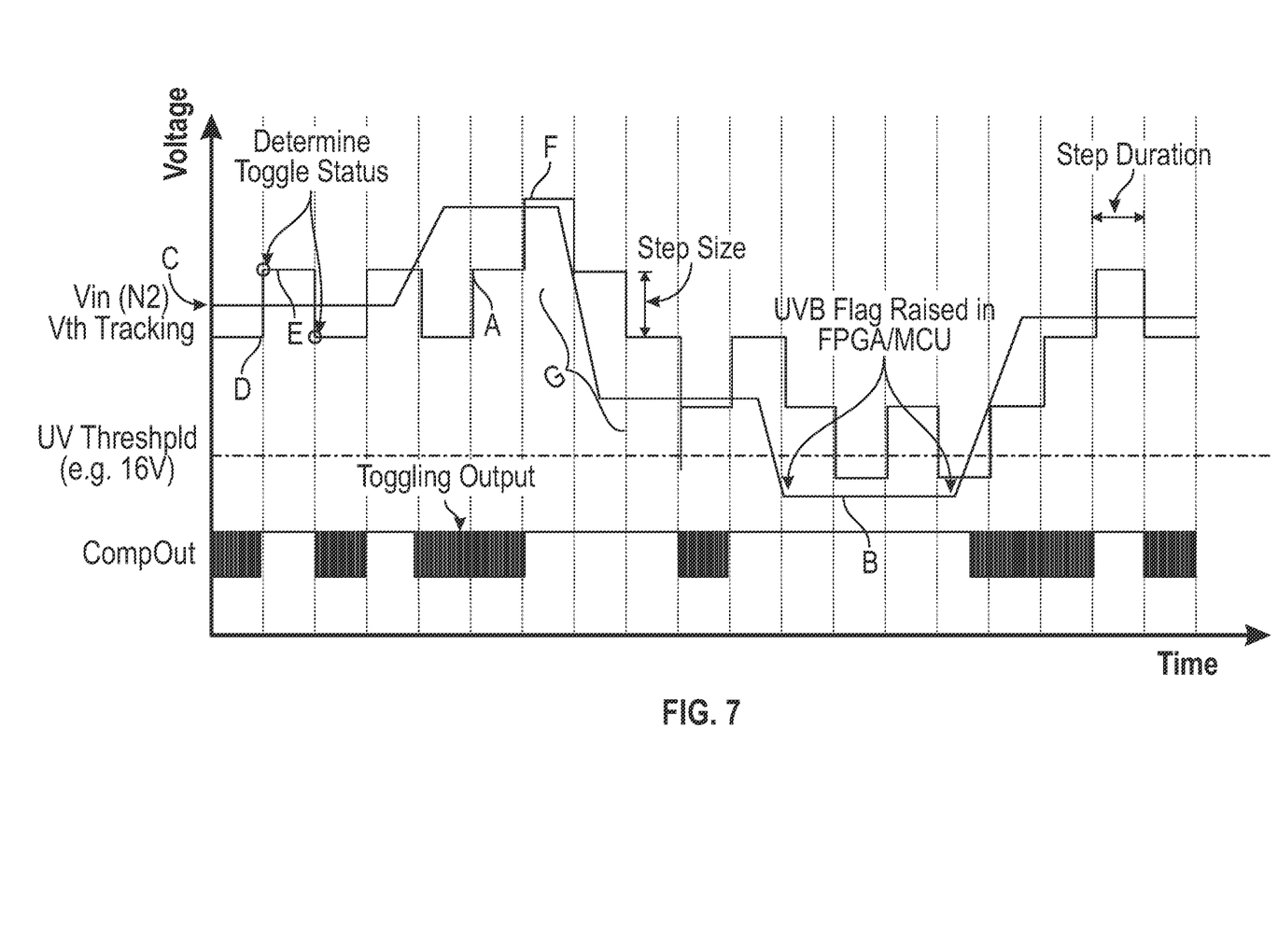
FIG. 7 show voltages at different locations in the fly-back converter of FIG. 6.
Figure 8:
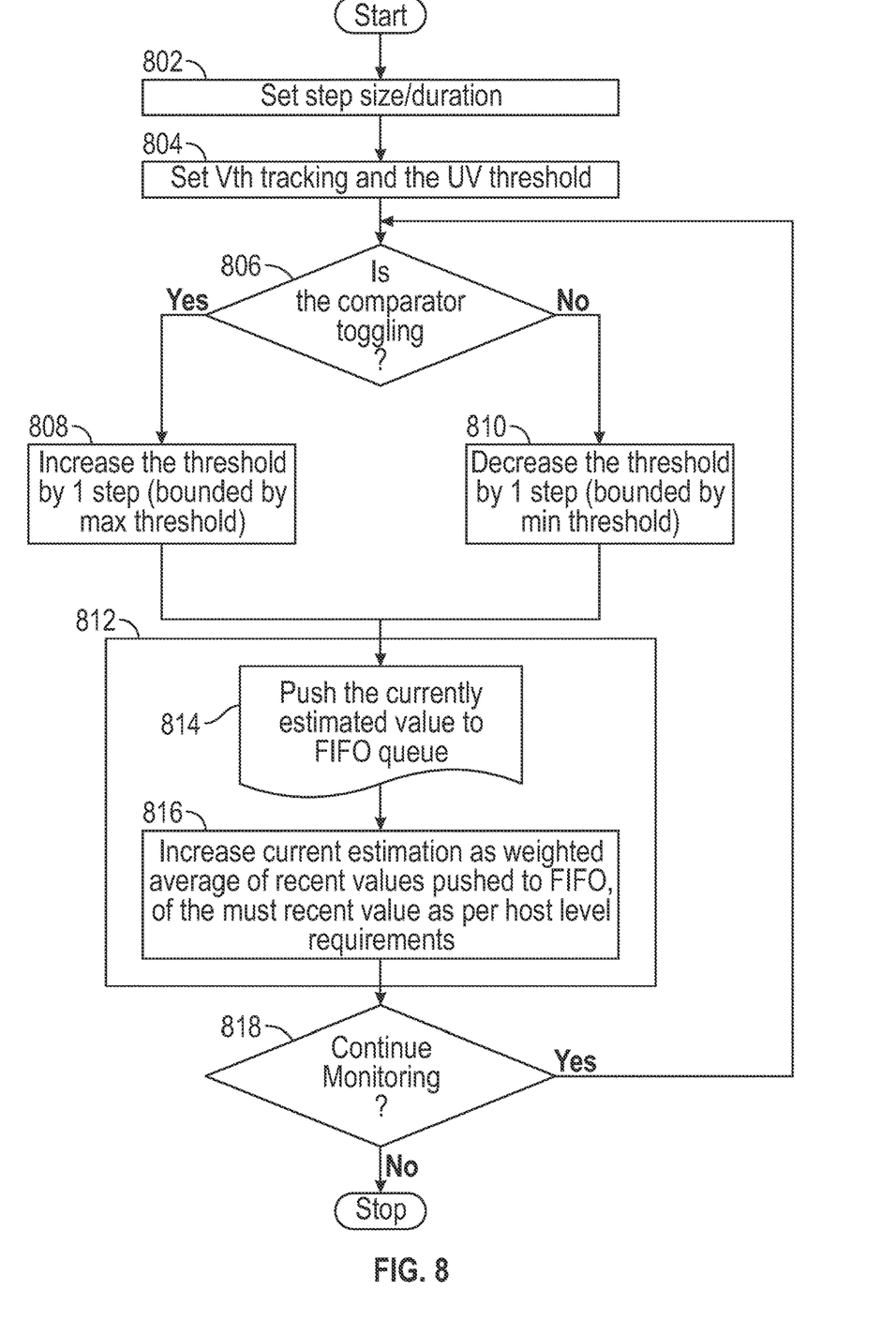
FIG. 8 shows a method of operating the fly-back converter voltage tracking of FIG. 6

With further reference now to FIGS. 7 and 8, operation of the system of FIG. 6 will be described.

In FIG. 7, an arbitrary voltage of Vin is provided. This can be, for example, the voltage at N2. Also shown is tracking voltage Vthtracking. How this is varied is explained further with respect to FIG. 8. Similar to the above, when Vin is greater than Vthtracking, the output of the comparator (CompOut) will toggle and no toggling will occur when it is below. Thus, by moving Vthtracking up until the toggling stops will track upward rising values of Vin and as Vin is falling, the same can be found by reducing Vthtracking until the toggling starts again. Thus, in one embodiment, the method can include moving the Vthtracking up and down around a set value until the move back up does not stop the toggling (e.g, in region A in FIG. 7). It should be noted that because Vthcontrol is known value, Vthtracking will also be known. Thus, to the extent that toggling Vthcontrol is below an undervoltage (UV) threshold (e.g., 16V) is known, an undervoltage flag/alarm can be raised even if the CompOut is not toggling. This is shown region B. Further, the steps can have a configurable step size and duration. Shortening either can improve the accuracy of tracking.

FIG. 8 shows a method according to one embodiment. The method details how continuous racking can be done with the circuit shown in FIG. 6 and refers to certain regions of FIG. 7.

The method includes a step of setting the step size and duration as indicated by block 802. Also, as an initial starting point, an initial value of Vthtracking and the UV threshold can also be set as indicated at block 804. Examples of this are shown in FIG. 7 at location C. As shown, Vthtracking is below Vin at N2 at location C and the UV threshold is set to an example of 16V.

At block 806 it is determined if CompOut is toggling. As noted above, if Vthtracking is below Vin, CompOut will be toggling. At location C on FIG. 7, Vthtracking is below Vin and CompOut is toggling. If CompOut is toggling, processing moves block 808 where Vthtracking is increased by one step. Of course, this could be limited by a max threshold level in embodiment. Otherwise, Vthtracking is reduced by one step (block 810). Examples of moving up and down are shown at locations D and E, respectively, in FIG. 7. In particular, at location D, there is toggling of CompOut so Vthtracking is increased. Then, at location E, there is no toggling so Vthtracking is decreased. In another example, in region A, Vthtracking was increased but Compout still toggled. Thus, Vthtracking is raised again and then stops the toggling as indicated at point F. Similar operations can be conducted when stepping down which creates a toggling of CompOut as illustrated in region G of FIG. 7.

Referring back to FIG. 8, regardless, the present incremented/decremented value of Vthtracking can then be provided to the controller. This can be a new Vthtracking or it can be used to generate a present estimate based on, for example, rolling average by saving the value in a FIFO queue (block 814) and then averaged (block 816). The process can proceed back to block 806 until the processes instructed to halt as indicated by block 818.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is not intended that the present disclosure be limited to the embodiment disclosed as the best mode contemplated for carrying out this present disclosure, but that the present disclosure will include all embodiments falling within the scope of the claims.

What is claimed is:

1. A fly-back circuit comprising:
   a voltage source;
   a transformer comprising a primary winding electrically coupled to the voltage source and a secondary winding electrically coupled to a load;
   a diode connected between the secondary winding and the load;
   a switch electrically coupled to the primary winding;
   a controller operable to open and close the switch to control energy transfer from the primary winding to the secondary winding; and
   a voltage monitor connected to a node between the secondary winding and the diode,
   wherein the voltage monitor includes a processor that generates a variable threshold tracking voltage (Vthtracking), and
   wherein the voltage monitor generates an output signal that is a toggling output when voltage at the node is above Vthtracking and a constant output when the voltage source is operating below Vthtracking, and
   wherein Vthtracking is increased when the output signal is toggling until the output signal is not toggling.

2. The fly-back circuit of claim 1, wherein the processor is a digital signal processor that determines whether the output signal is toggling or not toggling and increases Vthtracking when the output signal is toggling and decreases the output signal is not toggling.

3. The fly-back circuit of claim 1, wherein the voltage monitor includes a comparator that produces the output signal.

4. The fly-back circuit of claim 3, wherein the comparator includes a first input connected to the node and second input connected to Vthtracking.

5. The fly-back circuit of claim 4, wherein the first input is an inverting input and the second input is a non-inverting input.

6. The fly-back circuit of claim 5, further comprising:
   a filter connected between an output of the digital signal processor and non-inverting input that smooths a pulse width modulated signal produced by the digital signal processor to convert the pulse width modulated signal into Vthtracking.

7. The fly-back circuit of claim 6, wherein the filter is an RC circuit.

8. The fly-back circuit of claim 4, further comprising a voltage divider between the node and the first input.

9. The fly-back converter of claim 8, wherein the first input is an inverting input and the second input is a non-inverting input.

10. The fly-back circuit of claim 4, further comprising:
    an RC filter connected between an output of the digital signal processor and non-inverting input that smooths a pulse width modulated signal produced by the digital signal processor to convert the pulse width modulated signal into Vthtracking.

11. The fly-back circuit of claim 10, wherein the filter is an RC circuit.

12. The fly-back converter of claim 1, wherein the controller is a pulse width modulation controller operable to output a sequence of pulses to open and close the switch based on determining that the voltage source exceeds a minimum control voltage.

13. A method comprising:
    providing with a voltage source an input voltage to a primary side of a fly-back circuit that includes primary winding and a secondary winding;
    controlling a switch electrically coupled to the primary winding to transition between an open state and a closed state to control energy transfer from the primary winding to the secondary winding;
    monitoring voltage with a voltage monitor connected to the secondary winding at a node, wherein the voltage monitor includes a processor that generates a variable threshold tracking voltage (Vthtracking);

generating and output signal with the voltage monitor that is a toggling output when voltage at the node is above Vthtracking and a constant output when the voltage source is operating below Vthtracking; and increasing Vthtracking when output signal is toggling and decreasing Vthtracking when the output signal is not toggling.

14. The method of claim 13, wherein the voltage monitor includes a comparator that produces the output signal.

15. The method of claim 14, wherein the comparator includes a first input connected to the node and second input connected to a monitor threshold voltage.

16. The method of claim 15, wherein the first input is an inverting input and the second input is a non-inverting input.

\* \* \* \* \*